United States Patent [19]
Diehl

[11] Patent Number: 5,023,640
[45] Date of Patent: Jun. 11, 1991

[54] FILM METERING APPARATUS AND METHOD

[75] Inventor: Conrad Diehl, Rochester, N.Y.

[73] Assignee: Eastman Kodak Company, Rochester, N.Y.

[21] Appl. No.: 486,489

[22] Filed: Feb. 28, 1990

[51] Int. Cl.⁵ .............................................. G03B 1/18
[52] U.S. Cl. .................................. 354/173.1; 354/213
[58] Field of Search ............... 354/170, 173.11, 173.1, 354/213, 215, 217, 203, 206

[56] References Cited

U.S. PATENT DOCUMENTS

| | | | |
|---|---|---|---|
| 3,186,322 | 6/1965 | Beach | 354/206 |
| 3,709,128 | 1/1973 | Beach | 354/206 |
| 3,712,200 | 1/1973 | Beach | 354/206 |
| 3,724,348 | 4/1973 | Monks | 354/206 |
| 3,868,708 | 2/1975 | Winkler et al. | 354/206 |
| 3,895,389 | 7/1975 | Arai | 354/173.1 |
| 4,141,635 | 2/1979 | Asano et al. | 354/173.1 |
| 4,196,993 | 4/1980 | Stemme et al. | 354/173.1 |
| 4,202,616 | 5/1980 | Stemme et al. | 354/173.1 |
| 4,417,793 | 11/1983 | Oyokota et al. | 354/21 |
| 4,639,111 | 1/1987 | Harvey | 354/481 |

Primary Examiner—L. T. Hix
Assistant Examiner—David M. Gray
Attorney, Agent, or Firm—Roger A. Fields

[57] ABSTRACT

A film metering pawl suitable for use with a motorized film drive has a perforation sensing tooth with a sloping leading edge that allows the tooth to be cammed out of each perforation by the perforation leading edge during prewind/rewind. The pawl also has an integral ramp which cooperates with a fixed pin to be lifted out of each perforation during frame-to-frame film advance beyond registration positions between exposures, without the necessity for mechanical connection to the camera exposure system. An infrared sensor monitors pawl position for motor drive/synchronization purposes.

11 Claims, 2 Drawing Sheets

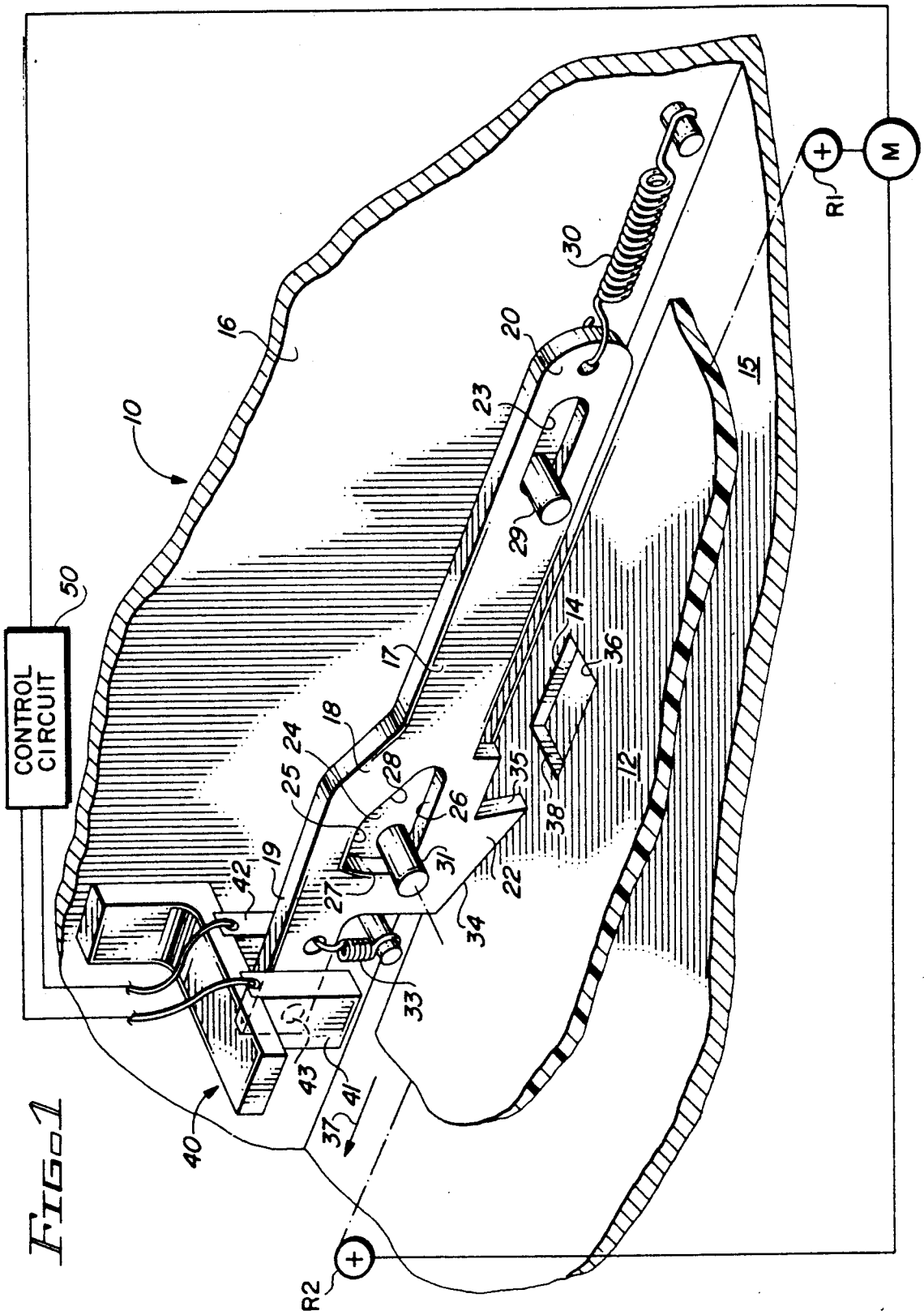

FILM METERING APPARATUS AND METHOD

The present invention relates generally to film frame metering and registration in a still film camera; and, more particularly, to an improved mechanical pawl film metering system suitable for use with motorized film advance drives, and permitting film prewind/rewind operations and multiple frame advancements.

BACKGROUND OF THE INVENTION

In a still camera, the importance of achieving accurate metering and registration of each image frame with the exposure gate in the frame-to-frame advance between exposures of a filmstrip has long been recognized. Proper frame alignment with the picture-taking optical axis not only ensures correct frame-to-frame spacing and avoidance of overlap in a series of exposed images, but also positions the film frame for properly locating exposure data and the like relating to a specific frame and recorded adjacent thereto on the film at the time of exposure for later reference in producing prints. Harvey U.S. Pat. No. 4,639,111, for example, discloses marginal encoding by optical means adjacent a frame at the time of exposure of frame specific field of view identification information in a tele/pan camera.

Cameras incorporating drive mechanisms for the frame-to-frame film transport between supply and take-up reels have means for stopping the advance of film along a camera exposure plane, at a position of registration of the next available frame in optical alignment with a picture-taking lens system. A common practice of achieving accuracy of metering and registration is to utilize film resident, frame correlated marginal fiducials in the form of single perforations per frame, which can be detected to determine the correct positioning for the next frame.

A well-known conventional system, uses a single perforation per frame film and a mechanical claw or pawl that detects the perforation corresponding to the next frame and establishes registration of that frame when that perforation reaches a desired stopping point. Examples of such film metering devices are shown in Beach U.S. Pat. Nos. 3,709,128 and 3,712,200; and Monks U.S. Pat. No. 3,724,348, the disclosures of which are incorporated herein.

Once registration is achieved, it is desirable to provide means to maintain such registration until commencement of the next exposure. In the absence of such provision, the film is subject to creep out of alignment due to vibration or physical forces exerted by the drive mechanism. For cameras designed operate with a single perforation per frame film, such as 110 and 126 format cameras, registration is typically maintained by engaging the pawl at a stopping point through the perforation and into a slot located in the camera wall or film cartridge, until the next exposure. The metering mechanism is mechanically coupled with the shutter release mechanism, to release the pawl from its registration engagement by a separate mechanical member which moves in response to taking the exposure. Because of the nature of the 110 and 126 film cartridges, the metering systems utilized therewith permit only a single frame-by-frame advance. Moreover, film motion is in a single direction only, with no rewind or prewind capability.

It is a desirable objective to have a film metering system that includes the positive mechanical engagement of a pawl tooth through a film perforation in order to maintain correct positional alignment of a filmstrip frame relative to an exposure gate, yet which is also suitable for use in cameras having a motorized film advance. It is also desirable to provide a mechanical pawl metering system that does not require mechanical interconnection with the shutter release mechanism. Another desirable objective is to have a film metering system that permits the film to be advanced by multiple frames at one time, if desired, and also allows the film to be prewound or rewound by being transported in a direction opposite to the normal frame-to-frame advance between exposures.

SUMMARY OF THE INVENTION

The present invention provides a mechanical pawl film metering apparatus and method for metering the frame-to-frame advance in a camera of a filmstrip perforated at predetermined intervals along its length, which is suitable for use in cameras having a motorized film advance, and which permits the film to be advanced selectively by multiple frames and transported in opposite directions.

The invention also provides a mechanical pawl film metering apparatus and method for use with perforated film that interacts with camera film drive and exposure controls by electrical, rather than mechanical, means.

In one aspect of the invention, a film metering mechanism has a film perforation sensing tooth and an elongated slot through which a first pin passes to permit rotational and longitudinal movement of the pawl relative to a camera housing. Means is provided to urge the pawl toward an exposure plane and into engagement with a sensed film perforation. The tooth includes a rearwardly and downwardly sloped leading edge surface that acts with the leading edge of the perforation to lift the pawl out of the perforation upon movement of the film in a prewind or rewind direction. The tooth also includes a rearwardly and downwardly sloped trailing edge surface that acts to engage the trailing edge of the perforation to secure the film in a frame exposure registration position.

In another aspect of the invention, a cutout having a rearwardly and downwardly sloping ramp or cam surface is provided through which a second pin passes. As the film is advanced beyond the registration position, the second pin acts with this ramp surface to disengage the tooth from the film perforation, to return the pawl to its initial position for sensing the advance of the next frame.

A preferred embodiment of the invention, discussed in greater detail below, utilizes a pawl position sensor in the form of an infrared electrical circuit which detects the position of a pawl extension to coordinate activation/deactivation of the film drive mechanism, shutter mechanism, etc., in accordance with the location of the tooth in or out of a perforation.

The metering system of the invention is suitable for cameras having a motorized film drive. It requires no mechanical connection with other camera mechanisms and interacts with the film drive by means of an electrical switching device. The system permits the film to be advanced by multiple frames, if desired, and allows the film to be transported in a reverse direction for prewind and/or rewind, as appropriate.

BRIEF DESCRIPTION OF THE DRAWINGS

An embodiment of the invention has been chosen for purposes of description and illustration, and is shown in the accompanying drawings, wherein:

FIG. 1 is a fragmentary view of a camera employing a film metering mechanism in accordance with an embodiment of the invention.

Throughout the drawings, like elements are referred to by like numerals.

DETAILED DESCRIPTION OF PREFERRED EMBODIMENT

Figure 2A:
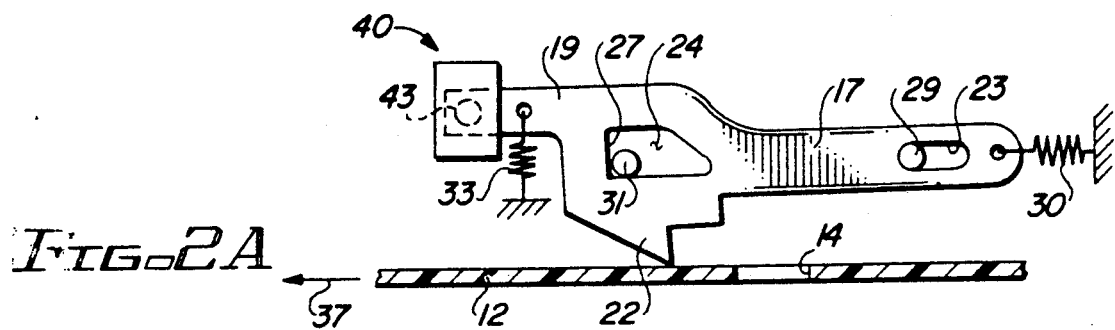
FIGS. 2A-2E are schematic views showing steps in the operation of the apparatus of FIG. 1.
Figure 2B:
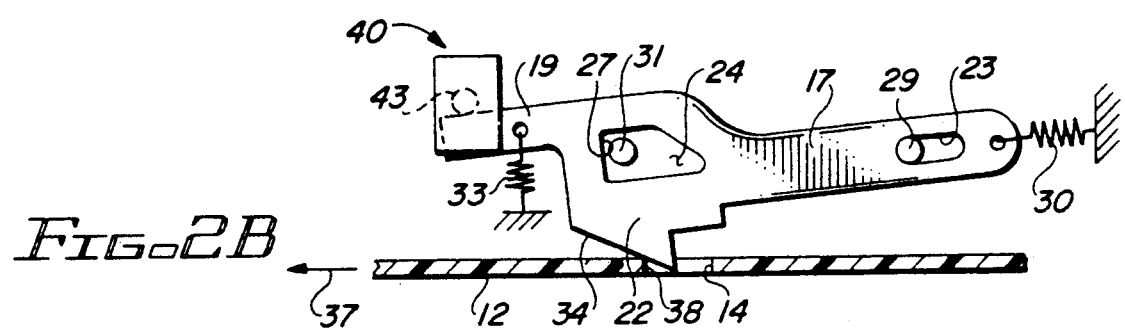

FIG. 1 shows an exemplary implementation of a film metering mechanism 10 suitable for use in metering the frame-to-frame advance of a strip of film 12 having marginal perforations 14 located at predefined intervals therealong. The film 12 is caused to travel along an exposure plane 15 within a camera body 16 by means of a motorized drive M operable for advancing the film 12 between reels R1, R2.

The mechanism 10 comprises an elongated pawl 17 having a central body section 18; a forward, generally longitudinally-aligned extension 19; a rearward, generally longitudinally-aligned arm portion 20; and a downwardly-projecting perforation-sensing tooth 22. The pawl 17 is mounted for rotational and longitudinal movement relative to the housing 16. It includes a generally longitudinally-aligned elongated slot 23 formed in the arm portion 20, and a four-sided cutout 24 formed in the central body section 18. The cutout 23 includes upper and lower, generally longitudinally-extending edges 25, 26, the upper edge being shorter than the lower edge; a generally laterally-extending forward edge 27 extending between leading points of the edges 25, 26; and a rear edge 28 joining trailing points of the upper and lower edges 25, 26 and providing a downwardly and rearwardly directed ramp or cam surface whose function is discussed in greater detail below.

A pin 29 connected to the camera body 16 extends through the slot 23 and means, such as a spring 30 extending between the arm 20 and the body 16, biases the pawl 17 to locate the pin 29 at a front end of the slot 23. A pin 31 connected to the body 16 extends through the cutout 24. The front edge surface 27 of the cutout 24 is relatively located so that the biasing means 30 also biases the pin 31 into abutment with the forward edge 27. A second spring 33, extending between pawl extension 19 and the camera body 16, serves to bias the pawl 17 in a direction of rotation about the axis of pin 29, urging the tooth 22 downwardly toward the exposure plane 15 and onto the film 12. Spring 33 also serves to urge pin 31 into contact with one of the surfaces 25 or 28 of the cutout 24.

The tooth 22 of the pawl 17 has a leading edge surface 34 sloped downwardly and rearwardly, and a trailing edge surface 35 sloped downwardly and rearwardly at a much steeper slope than edge 34. The trailing edge 35 is configured to catch and hold the trailing edge 36 of a perforation 14, when the film 12 is driven in the frame-to-frame advance direction (indicated by arrow 37) between exposures. The slope of the leading edge 34 is configured to act with the leading edge 38 of the perforation 14 to permit the pawl 17 to ride up and out of the perforation 14 against the bias of spring 33, when the film 12 is driven in a reverse direction (direction opposite arrow 37), such as during film prewind or rewind.

The position of the pawl 17 relative to the camera body 16 is detectable by means of a sensor 40 located on the housing 16 so as to detect shifts in the rotational position of the pawl extension 19. The shown embodiment includes paired infrared emitter and detector elements 41, 42, aligned to monitor the passage of extension 19 through an infrared beam 43.

The operation of the mechanism 10 is described with reference to FIGS. 2A-2E.

FIG. 2A shows the metering pawl 17 in its FIG. 1 position, as the film 12 is being advanced in the direction of arrow 37 to a next available exposure frame position. The movement of the pawl 17 is guided by the two fixed pins 29, 31, with pin 29 engaging the slot 23 and pin 31 engaging the cutout 24. Spring 30 pulls the rear of the pawl 17 opposite the direction 37, so that the forward end of slot 23 bears against pin 29 and the forward edge 27 of cutout 24 bears against pin 31. Spring 33 pulls the front of the pawl 17 down (in the direction of counterclockwise rotation about pin 29), so that tooth 22 rests against the moving film 12. Contact of pin 31 with the surface 25 or 28 (FIG. 1) of cutout 24 is prevented by contact of the point of tooth 22 with a non-perforation portion of the upper surface of the film 12. The extension 19 of the pawl 17 interrupts the infrared beam 43 of the sensor 40.

As the motor M continues to advance the film 12 in the direction 37 (FIG. 2B), a perforation 14 reaches the position of the point of pawl tooth 22 and tooth 22 enters the perforation 14 due to the downward counterclockwise rotational force about pin 29 provided by spring 33. The pawl 17 pivots about the pin 29 so that the tooth point enters the perforation 14 and the sloping leading edge 34 of tooth 22 contacts the perforation leading edge 38. Pin 29 stays at the forward end of slot 23; and pin 31 stays at the forward edge 27 of cutout 24, but begins to travel up the edge 27 at the tooth 22 descends. During this motion, extension 19 of the pawl 17 moves so that it no longer blocks the transmission of the infrared beam 43 of sensor 40. Detection of the beam by the detector element 42 (FIG. 1) causes generation of an electrical signal which is transmitted to control circuit 50 (FIG. 1) to be used, for example, to stop film advance by control of the camera drive motor M. (It is recognized that various other switching devices can be used for this purpose.) The film advance movement does not stop immediately because the inertia of the motor results in some coasting to a stop, even when the motor M is electrically braked at this point.

Figure 2C:
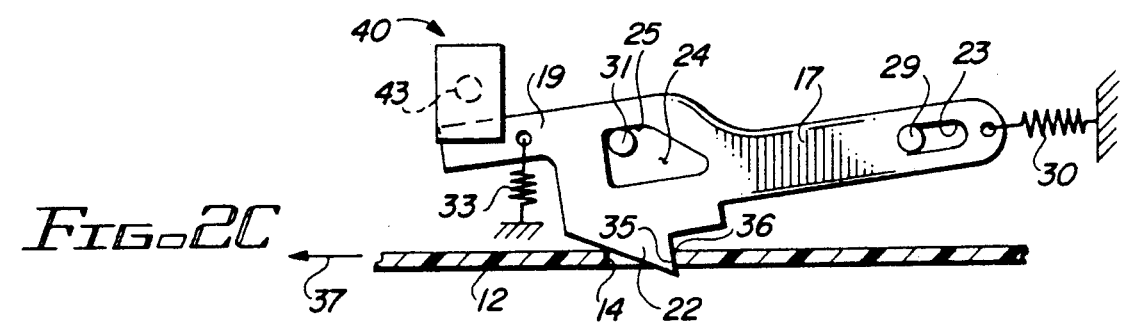

The pawl tooth 22 continues to enter the perforation 14 until the top edge 25 of the cutout 24 is reached by pin 31 (FIG. 2C). Further motion of the film 12 causes the trailing edge 36 of the perforation 14 to contact the steep trailing edge 35 of the tooth 22, and to drive the pawl 17 with the film 12 so that the forward end of the slot 23 no longer bears against the pin 29 (FIG. 2D).

Figure 2D:
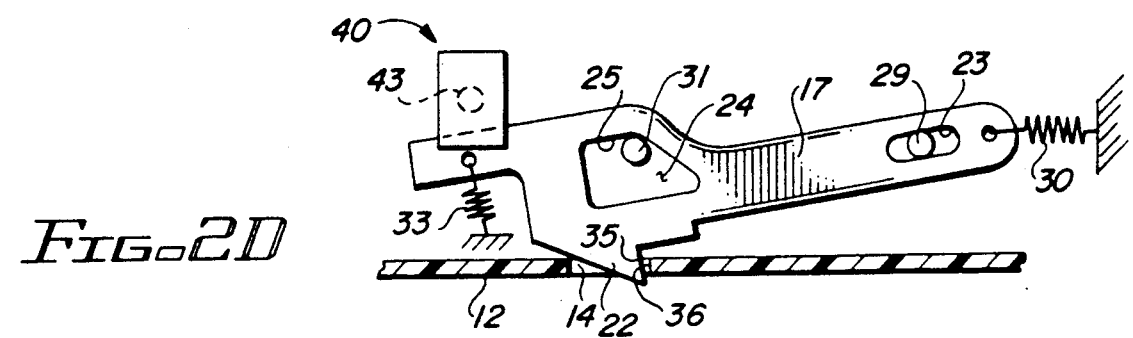

For the embodiment shown, the metering mechanism 10 is designed so that the film advance motor M stops with the film 12 in a position of registration with the exposure gate, when the pawl is located as shown in FIG. 2D. In this rest position, the force of spring 30 is transmitted through the contact of the trailing edge 35 of the pawl 17 to the trailing 36 of the film 12, and is resisted by residual tension in the direction of arrow 37 from the camera motor drive M. The rest position (FIG. 2D) is stable because any slight movement causes an unbalance in these opposing forces, which tends to return the film 12 back to the registration position. Slight motion of the film 12 in the forward direction (direction of arrow 37) will cause the residual tension to decrease below the opposing force provided by spring 30; and, conversely, slight motion of the film 12 in the reverse direction (opposite arrow 37) will increase residual film tension to a force greater than that of spring 30.

Figure 2E:
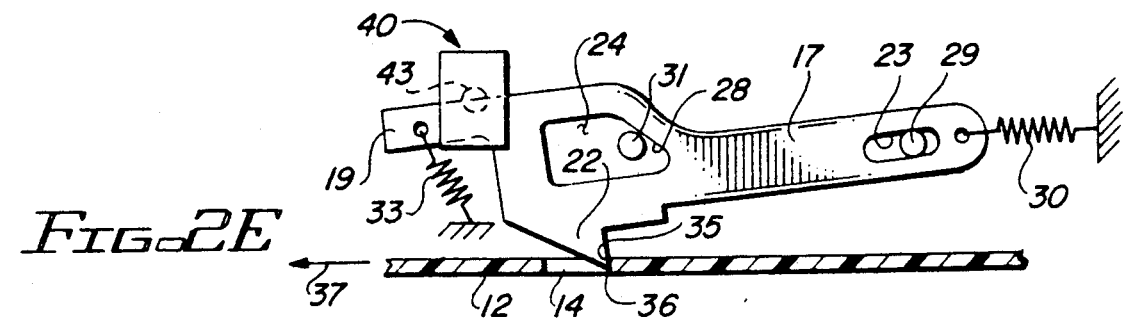

In order to advance the film 12 for another exposure, the film drive motor M is restarted and the film 12 moves further forward in the direction 37, as shown in FIG. 2E, moving the pin 29 rearwardly in the slot 23 and the pin 31 rearwardly in the cutout 24, against the bias of spring 30. As the pawl 17 moves forward, pin 31, which at the rest position (FIG. 2D) was at the rear of the upper edge 25, begins to contact the ramp surface 28 of the cutout 24, with the result that further motion of the pawl 17 in the direction of arrow 37 causes the tooth 22 to be lifted out of the perforation 14. The pawl 19 then returns to its start position as shown in FIGS. 1 and 2A, under the forces exerted by the springs 30, 33. The extension 19 is likewise returned to its initial beam-blocking position relative to the infrared beam 33.

The metering device thus described is especially suitable for use with cameras that have a motorized film advance, as no mechanical connection with other camera mechanisms is required and film advance can be controlled by means of electrical signals generated by the sensor 40. The film 12 may be advanced by multiple frames at one time, if the motor M is not stopped at a perforation 14 intended to be bypassed. The pawl 17 will merely cycle through the described sequence of steps (FIGS. 2A-2E), without stopping at the registration position (FIG. 2D).

When the film motion is in the direction opposite to arrow 37 (viz. for prewind or rewind operation), the pawl tooth 22 enters the perforation 14 and the infrared sensor 40 senses its presence. However, in such case, the pawl 17 presents little opposition to the motion of the film 12 because the leading edge 38 of the perforation 14 (see FIG. 2B) acts upon the sloping forward edge 34 of the tooth 22 to lift the tooth out of the perforation 14 as the film 12 is moved. Also, if the film 12 is threaded in such reverse direction (viz. prewind cameras), the sloping forward edge of the tooth 22 allows the end of the film leader to lift the pawl 17 and readily pass by. The control circuit 50 will receive a signal from the sensor 40 for each passing perforation.

It is, thus, apparent that a film metering mechanism in accordance with the invention provides for detection of the presence of a film perforation so that camera controls can maintain a frame count when the film moves in either direction; provides for detection of the presence of a film perforation during a film frame-to-frame advance cycle in order that the film may be stopped in a proper registration position for the next exposure; and provides for maintaining the film in proper registration even under the influence of rough handling conditions which would otherwise cause the film to be shifted.

Those skilled in the art to which the invention relates will understand that the foregoing detailed description is intended to be merely exemplary and not exclusive, and that various substitutions and modifications may be made to the described embodiment without departing from the spirit and scope of the invention as defined by the claims below.

What is claimed is:

1. In a camera having a housing, means defining an exposure plane within said housing, and means for advancing a strip of film in a frame-to-frame advancement direction along said exposure plane, said film having a plurality of perforations located at predetermined frame metering intervals along said film, frame metering apparatus comprising:

first and second pins fixedly located on said housing;

an elongated pawl including a film perforation sensing tooth; said pawl being formed with an elongated slot and an integral ramp surface; and said pawl being mounted for rotation and longitudinal movement relative to said housing, with said first pin engaging said slot and said second pin proximate said ramp surface;

means biasing said pawl in a longitudinal direction, said said ramp surface being urged in noncontacting relationship relative to said second pin; and means biasing said pawl in a rotational direction about said fist pin, with said tooth being urged toward said exposure plane; and electronic sensing means for monitoring the position of said pawl, and for developing an electrical signal indicative of when said pawl tooth is engaged in said perforation;

said pawl and biasing means being relatively dimensioned, configured and adapted so that said tooth is urged in engage with a perforation when said film is moved in said advancement direction to a position of registration of a next available exposure frame, and said ramp surface is brought into engagement with said second pin against the bias of said longitudinal direction biasing means to disengage said tooth from said perforation in response to movement of said tooth with said film, when said film is moved beyond said registration position further in said advancement direction.

2. Film frame metering apparatus as in claim 1, wherein said pawl tooth has leading and trailing edge surfaces, wherein said tooth trailing edge surface is configured so that said tooth engaged with said perforation will travel with said film when said film is further moved in said advancement direction, and wherein said tooth leading edge surface is configured so that said tooth engaged with said perforation will disengage from said perforation when said film is further moved in a direction opposite said advancement direction.

3. Film frame metering apparatus as in claim 2, wherein said pawl tooth leading and trailing edge surfaces both slope rearwardly and downwardly toward said exposure plane, and the slope of said tooth trailing edge surface is steeper than the slope of said tooth leading edge surface.

4. Film frame metering apparatus as in claim 1, wherein said pawl further comprises a longitudinal extension, and said sensing means comprises electro-optical sensing means for monitoring the position of said pawl extension.

5. In a camera having a housing, means defining an exposure plane within said housing, and means for advancing a strip of film in a frame-to-frame advancement direction along said exposure plane, said film having a plurality of perforations with leading and trailing edges located at predetermined frame metering intervals along said film, frame metering apparatus comprising:

first and second pins fixedly located on said housing;

a pawl including a body section, an elongated arm portion extending from said body section, and a film perforation sensing tooth; said body section being formed with a cutout including a front edge surface, an upper edge surface and a ramp edge surface; said arm portion being formed with an elongated slot having forward and rearward ends; and said pawl being mounted for rotational and longitudinal movement relative to said housing, with said first pin engaging said slot and said second pin engaging said cutout;

means biasing said pawl in a longitudinal direction with said first pin urged into contact with said slot forward ends, and said second pin urged into contact with said cutout front edge surface; and means biasing said pawl in a rotational direction about said first pin, with said tooth being urged toward said exposure plane and said second pin being urged against said upper and ramp edge surfaces;

said pawl and biasing means being relatively dimensioned, configured and adapted so that said film is moved in said advancement direction to a position of registration of a next available frame for exposure in said exposure plane, and said ramp edge surface is brought into engagement with said second pin against the bias of said longitudinal direction biasing means to disengage said tooth from said perforation when said film is moved beyond said registration position further in said advancement direction.

6. Film frame metering apparatus as in claim 5, wherein said pawl tooth has leading and trailing edge surfaces which both slope rearwardly and downwardly toward said exposure plane; said slope of said tooth trailing edge surface being steeper than the slope of said tooth leading edge surface and being configured so that said tooth engaged with said perforation will travel with said film, through contact of said tooth trailing edge surface with said perforation trailing edge, when said film is further moved in said advancement direction; and said tooth leading edge surface being configured so that said tooth engaged in said perforation will disengage from said perforation, through contact of said tooth leading edge surface with said perforation leading edge, when said film is moved in a direction opposite to said advancement direction.

7. Film frame metering apparatus as in claim 6, wherein said pawl further comprises an elongated extension projecting forwardly of said body section, and sensing means for monitoring the position of said extension for determining the presence or absence of engagement of said tooth within said perforation.

8. Film frame metering apparatus as in claim 7, wherein said longitudinal direction biasing means comprises a spring connecting said arm portion rearwardly of said slot to said camera housing, and said rotational direction biasing means comprises a spring connecting said extension to said camera housing.

9. Film frame metering apparatus as in claim 8, wherein said sensing means further comprises means for generating an electrical signal indicative of when said extension passes through an optical beam.

10. A method for metering the exposure frames of a strip of film in a camera having a housing, means defining an exposure plane within said housing, and means for advancing said film in an advancement direction along said exposure plane, said film having a plurality of perforations located at predetermined frame metering intervals along said film, said method comprising the steps of:

providing first and second pins in fixed positions relative to said housing, and providing a pawl movably mounted on said housing, said pawl including a perforation sensing tooth, an elongated slot engaged with said first pin, and a ramp surface proximate said second pin;

biasing said ramp surface out of contact with said second pin;

biasing said pawl in a rotational direction about said first pin, with said tooth being urged against said film;

moving said film in said advancement direction to a position of frame registration, so that said tooth automatically engages in a perforation due to said pawl biasing;

moving said film further in said advancement direction beyond said registration position, so that said tooth travels with said perforation and film to move said pawl to being said ramp surface into contact with said second pin, against said biasing of said ramp surface, to automatically disengage said tooth from said perforation; and monitoring the position of the pawl to develop an electrical signal for control of movement of the film in response to the engagement or disengagement of said tooth within said perforation.

11. A method as in claim 10, wherein said perforations have leading edges, said tooth is provided with a sloped leading edge surface; and said method further comprises the step of moving said film in a direction opposite to said advancement direction, so that said tooth automatically engages in a second perforation due to said pawl biasing, and the step of moving said film further in said opposite direction to automatically disengage said tooth from said second perforation by contact of said second perforation leading edge with said tooth leading edge surface.

* * * * *